Oct. 12, 1965 J. L. WILLIAMS ETAL 3,211,965

MAGNETIC STRUCTURES

Filed Sept. 6, 1963

2 Sheets-Sheet 1

Oct. 12, 1965 J. L. WILLIAMS ETAL 3,211,965

MAGNETIC STRUCTURES

Filed Sept. 6, 1963 2 Sheets-Sheet 2

3,211,965

MAGNETIC STRUCTURES

John Lewis Williams, Wilmslow, and Roger Bayes, Sale, England, assignors to Associated Electrical Industries Limited, London, England, a British company Filed Sept. 6, 1963, Ser. No. 307,252
Claims priority, application Great Britain, Sept. 21, 1962, 36,026/62
5 Claims. (Cl. 317—158)

This invention relates to magnetic structures and has in view the provision of a magnetic structure in which a non-magnetic gap of accurately predetermined width can be provided in a simple and advantageous manner.

A magnetic structure defining a non-magnetic gap of accurately predetermined width is essential in experiments requiring high homogeneity magnetic fields and necessitates close parallelism of pole pieces between which such a gap exists. For example in the case of experiments involving high resolution nuclear magnetic resonance it is desirable that the pole pieces should be parallel to an accuracy of 0.0001″ or better over a 9″ diameter. It may be difficult to manufacture the elements of a magnetic structure sufficiently accurately to give this accuracy, particularly where the pole pieces are carried on magnetic limbs of, say, 30″ in length, as may well be the case, so that adjustment of the elements on assembly of the magnetic structure is usually required.

It is an object of the present invention to provide a magnetic structure wherein such adjustment is simplified.

According to the invention there is provided in a gap between opposing surfaces of a magnetic structure a pair of magnetic pole pieces and intervening non-magnetic spacing means assembled together to provide between facing surfaces of the pole pieces a non-magnetic gap of predetermined width less than that of the gap containing the assembly, one pole piece being secured to one of said opposing surfaces. In this way the effective non-magnetic gap in the structure, namely that between the pole pieces, can be accurately determined on assembly of the magnetic pole pieces and intervening non-magnetic spacing means which constitute an easily adjustable separate assembly defining the gap. The need for adjustment of the magnetic structure as a whole to provide a non-magnetic gap of predetermined width is therefore avoided.

Figure 1:
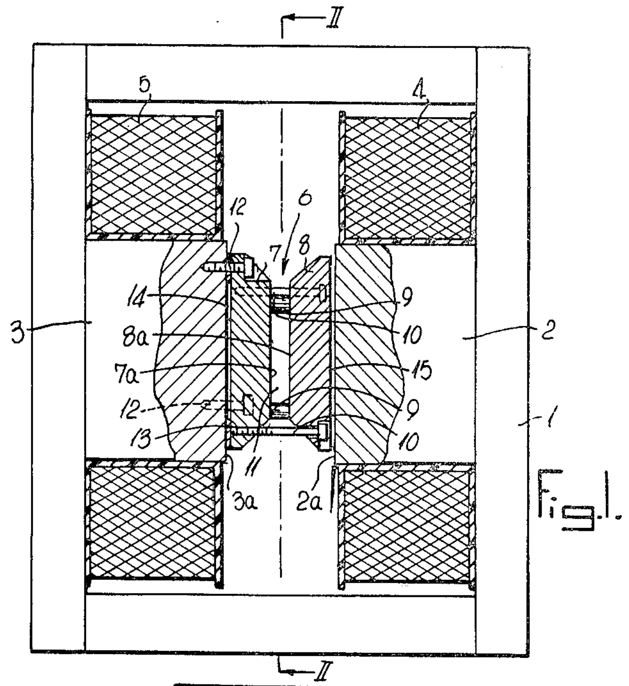
Figure 2:
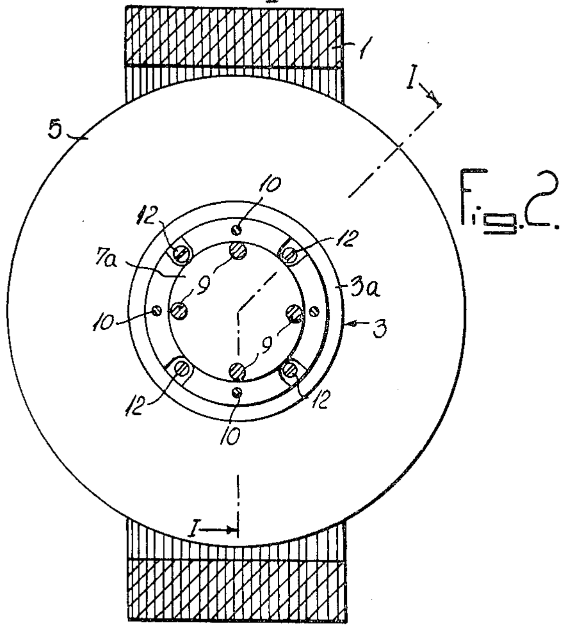
Figure 3:
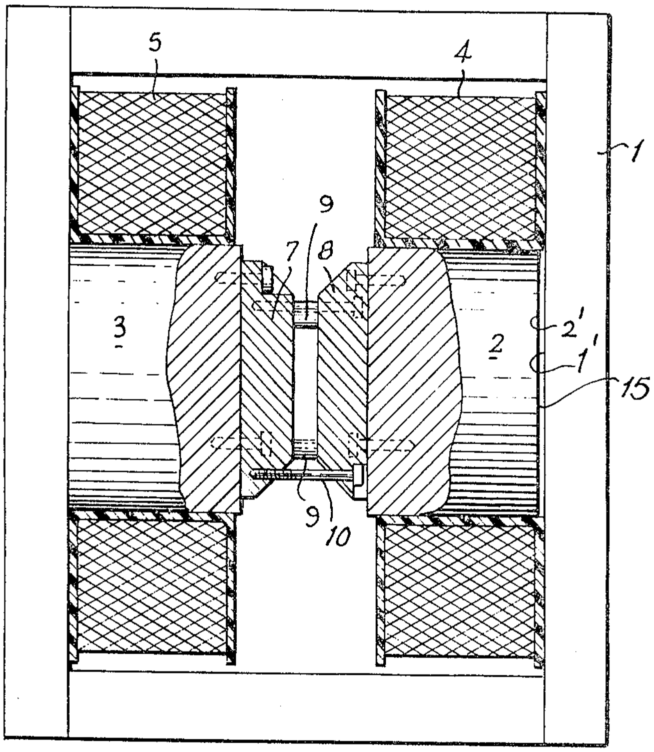

In order that the invention may be more fully understood reference will now be made by way of example to the accompanying drawings in which:

FIGS. 1 and 2 are respective sectional views of a magnetic structure conforming to the invention, FIG. 1 being a section taken along the line I—I of FIG. 2 and FIG. 2 being a section taken along the line II—II of FIG. 1; and FIG. 3 is a sectional view illustrating a modified form of magnetic structure conforming to the invention.

Referring to FIGS. 1 and 2, the magnetic structure there shown comprises an outer magnetic frame 1 carrying a pair of spaced magnetic limbs 2, 3 on which are mounted respective magnetizing coils 4, 5. In the gap between opposing surfaces 2*a*, 3*a* of the limbs 2, 3 is located a pole-piece assembly 6 comprising two magnetic pole pieces 7, 8 and intervening non-magnetic spacing pillars 9, the assembly being clamped together by means of tie-bolts 10. The length of these pillars 9, which are preferably of a material of low temperature coefficient, is accurately dimensioned, for instance by grinding, so as to determine with precision the width of the non-magnetic (air) gap 11 defined between the facing surfaces 7*a*, 8*a* of the pole pieces 7, 8. Because of their relatively small area these facing surfaces 7*a*, 8*a* can be accurately machined to close tolerances so as to extend accurately in parallel (or other relationship which may be desired) with each other.

The assembly 6 is secured to the magnetic limb 3 by means of fixing screws 12. A non-magnetic (e.g. brass) spacing ring 13 may be interposed, as shown, between the surface 3*a* of the limb 3 and the pole piece 7 to provide a secondary non-magnetic gap 14, but the pole piece 7 could be mounted directly on the limb 3.

For the purpose of isolating the assembly 6 from the main magnetic structure so that the assembly will not be subjected to mechanical stresses arising for example from thermal and magnetic effects in the structure, there exists between the surface 2*a* of the other magnetic limb 2 and the assembly 6 an isolating non-magnetic gap 15 having a width which, according to the particular application of the magnetic structure, can vary between say, 1/32″ and 1/16″ in correspondence with variation in dimensions of the magnetic frame 1, of the magnetic limbs 2, 3, and of the spacing ring 13 due to manufacturing tolerances. The isolating gap 15 may even taper or be otherwise non-uniform. However, although any non-uniformity in the width of the isolating gap 15, and also in the gap 14 when present, would result, in use, in inequalities of the flux density in these gaps (the flux distribution being inversely proportional to the gap width), any such inequalities are in effect "ironed out" by redistribution of the flux in the pole pieces 7, 8, so that in the gap 11 of the assembly 6 the flux density has high homogeneity due to the precision with which this latter gap is defined. Instead of the isolating gap 15 being in the position shown, such a gap may be provided at any other convenient position in the magnetic structure where it will be effective for the purposes of isolation as aforesaid. For instance, as shown in the modified magnetic structure of FIG. 3, such gap 15 may be at the other side of the magnetic limb 2 between that limb and the outer magnetic frame 1. In this modified structure the pole piece 8 is secured to the magnetic limb 2 which effectively constitutes a magnetic extension of the pole piece 8 and is separate from the magnetic frame 1 to define, between its surface 2′ and the opposing surface 1′ of the frame 1, the isolating gap 15. Also, in the modified structure of FIG. 3 the spacing ring 13 is dispensed with to equalize the magnetic circuit in the vicinity of the pole-piece assembly 6.

The present invention thus provides a magnetic structure in which a non-magnetic gap (11) of accurately predetermined width is provided and in which a highly homogeneous magnetic field can be produced, without the need for manufacturing to close tolerances relatively bulky parts of the structure such as the magnetic frame and magnetic limbs, or the need for making on assembly adjustment to the magnetic structure as a whole in order to obtain the width of gap with the accuracy required. In addition it has been found that in using a magnetic structure according to the invention in applications involving high resolution nuclear magnetic resonance, the pole pieces of the pole-piece assembly (6) are less sensitive than pole pieces of prior magnetic structures to distortion by magnetic forces and to variations with time of their relative stability which are continually taking place due to the temperature gradients in the magnetic structure. Since such variations necessitate regular adjustment by means of correcting coils or by other means in order to maintain the required homogeneity of the magnetic field, the magnetic structure of the present invention facilitates easier operation in such applications.

What we claim is:

1. A magnetic structure having opposing surfaces defining between them a gap containing a pole piece assembly comprising a pair of magnetic pole pieces and intervening non-magnetic spacing means assembled together, said pole pieces having spaced facing surfaces defining between them in said assembly a non-magnetic gap of predetermined width, only one of said pole pieces being secured to one of said opposing surfaces for locating the assembly in the gap containing it.

2. A magnetic structure as claimed in claim 1 in which said pole piece assembly is so dimensioned in relation to the gap containing it as to define an isolating non-magnetic gap between the other of said pole pieces and the other of said opposing surfaces.

3. A magnetic structure as claimed in claim 1 including further non-magnetic spacing means interposed between the secured pole piece and the surface to which it is secured, thereby to provide between them a secondary non-magnetic gap.

4. A magnetic structure as claimed in claim 1 wherein said gap of predetermined width is an air gap, said intervening non-magnetic spacing means being pillar-like spacing members extending between said facing surfaces of the pole pieces.

5. A magnetic structure having opposing surfaces defining between them a gap containing a pole piece assembly comprising a pair of magnetic pole pieces having facing surfaces which are spaced apart by means of pillar-like spacing members to define between them in said assembly a non-magnetic gap of predetermined width, which assembly is located in the gap containing it by having only one of said pole pieces secured to only one of said opposing surfaces with non-magnetic spacing means interposed between that pole piece and that surface to provide a non-magnetic gap therebetween, and the assembly is so dimensioned in relation to the gap containing it as to define an isolating non-magnetic gap between the other of said pole pieces and the other of said opposing surfaces.

References Cited by the Examiner

UNITED STATES PATENTS

| | | | |
|---|---|---|---|
| 2,819,431 | 1/58 | Maxwell | 317—158 |
| 2,917,682 | 12/59 | Kirchner et al. | 317—158 |
| 2,962,636 | 11/60 | Purcell | 317—158 |

BERNARD A. GILHEANY, *Primary Examiner.*

JOHN F. BURNS, *Examiner.*